(12) United States Patent
Jang et al.

(10) Patent No.: US 6,522,375 B1
(45) Date of Patent: *Feb. 18, 2003

(54) REFLECTION TYPE LIQUID CRYSTAL DISPLAY AND A METHOD FOR FABRICATING THE SAME

(75) Inventors: Yong-Kyu Jang, Suwon (KR); Young-Kuil Joo, Suwon (KR); Jih-Oh Kwag, Suwon (KR); Myeon-Koo Kang, Seoul (KR); Jong-Eup Shin, Seoul (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,997

(22) Filed: Mar. 6, 2000

(30) Foreign Application Priority Data

Mar. 4, 1999 (KR) ............................................. 99-7093
Jun. 18, 1999 (KR) ........................................... 99-22989

(51) Int. Cl.$^7$ ............................................. G02F 1/1343
(52) U.S. Cl. ................................................... 349/113
(58) Field of Search ...................... 349/113, 67, 114, 349/156

(56) References Cited

U.S. PATENT DOCUMENTS 4,205,428 A * 6/1980 Ernstoff et al. ............. 29/592
5,387,485 A * 2/1995 Sukegawa et al. ............ 430/5
5,408,345 A * 4/1995 Mitsui et al. ................ 359/59
5,725,971 A * 3/1998 Moriuchi et al. ............ 430/5
5,725,976 A * 3/1998 Tsuyoshi et al. ............. 430/7
5,777,068 A * 7/1998 Akira et al. ................. 528/353
5,847,789 A * 12/1998 Nakamura et al. ........... 349/99
5,863,411 A * 1/1999 Kang et al. ................. 205/645
5,946,065 A * 8/1999 Tagusa et al. .............. 349/138
5,973,843 A * 10/1999 Nakamura .................. 359/619
6,048,647 A * 4/2000 Miyazaki et al. ............. 430/5
6,172,728 B1 * 1/2001 Hiraishi ..................... 349/139
6,348,096 B1 * 2/2002 Sunakawa et al. ........... 117/88

FOREIGN PATENT DOCUMENTS

JP 356021125 A * 2/1981
JP 363128347 A * 5/1988
JP 200250224 A * 9/2000

* cited by examiner

Primary Examiner—Toan Ton
Assistant Examiner—Hoan Nguyen
(74) Attorney, Agent, or Firm—Hae-Chan Park; McGuireWoods LLP

(57) ABSTRACT

Disclosed is a reflection type liquid crystal display and a method for fabricating the same. The reflection type liquid crystal display comprises a reflection electrode of which surface has a plurality of irregular and convex polygons, widths of respective ravines between the convex polygons being constant. Thus, since sizes and heights of the convex polygons are irregular in all directions and flat regions corresponding to the ravines are highly decreased, light reflectivity is enhanced and misalignment of liquid crystal molecules is minimized.

19 Claims, 10 Drawing Sheets

Vertical

Horizontal

REFLECTION TYPE LIQUID CRYSTAL DISPLAY AND A METHOD FOR FABRICATING THE SAME

BACKGROUND OF THE INVENTION

1. Field of the Invention

The present invention generally relates to a reflection type liquid crystal display, and more specifically to a reflection type liquid crystal display having a reflection electrode with bumps and a method for fabricating the same.

2. Description of the Related Art

Generally, a cathode ray tubes (CRT) used for displays like monitors of televisions or computers is not easy to install or move due to its bulky volume, heavy weight, and enormous power consumption. To overcome such disadvantages, liquid crystal displays (LCDs), plasma display panels, or flat panel displays using an electroluminescence element have been proposed and widely used.

High definition and multicolor display driven at a lower voltage with less power consumption makes the LCDs considered as one of most leading display device. In addition, LCDs are easy to manufacture, and therefore, are widely used for various electronic devices. There are two types of LCDs: a projection type display using an external light source; and a reflection type display using ambient lights.

The reflection type display is thin and light. It consumes less power because backlight devices are not necessary. It shows an excellent display outdoors. Thus, the reflection type displays are widely used for a portable device.

However, the current reflection type LCD has a dark screen and fails to show high definition and multicolor images. Therefore, the reflection type LCDs are employed for a low price product that requires a simple pattern display, such as numbers.

To use reflection type LCD for a portable information device, such as a document viewer and an internet viewer, a high definition and multicolor display with an enhanced reflection luminance is necessary. Such an enhancement in reflection luminance and high definition is also necessary to easily look at the monochromatic LCDs that mainly display character information. However, such an enhancement requires an active matrix substrate having a switching element, for example, thin film transistors. In practice, a device using a monochromatic LCD are sold at a lower price. Therefore, it cannot use thin film transistor LCDs of a high price.

In the long run, the portable information devices would provide a multicolor display function. The monochromatic LCDs will fade away, and the reflection type LCD devices with a multicolor display function are under development.

Despite the developing panel technologies and the expanding market, the reflection type multicolor LCDs are rarely available commercially. This is because the reflection type multicolor LCD devices have shown a poor performance in brightness, contrast, and a response time.

Two techniques are combined to obtain an improved brightness. One is enhancing a reflectivity of a reflection electrode, and the other is achieving a high aperture ratio. The reflectivity enhancement has been used for a conventional guest-host liquid crystal displays. Maximizing a reflectivity by allowing minute bumps to a reflection electrode is disclosed in U.S. Pat. No. 5,408,345 entitled "Reflection type liquid crystal display device wherein the reflector has bumps".

However, the ideal reflectivity has not yet been achieved, always requiring a reflectivity enhancement for the reflection type liquid crystal displays.

FIG. 1 is a simplified plan view showing the surface of a reflection electrode described in the prior art.

Referring to FIG. 1, a reflection electrode 10 has a surface that a plurality of microlenses 2 of convex semi-spheres are irregularly arranged and a plurality of ravines 4 are arranged between the microlenses 2, the ravines having different areas depending on their respective positions. Such surface structure allows the microlenses 2 of the reflection electrode 10 to have different heights, resulting in low and irregular reflectivity from place to place.

Moreover, the low and irregular reflectivity makes liquid crystal molecules aligned non-homogeneously, and causes a very low contrast ratio during display of pictures.

In addition, since the ravine width is different from place to place, it is difficult to precisely form the microlenses in accordance with its design dimension.

Moreover, the prior art has a drawback that requires two photolithography processes: a first photolithography process for forming microlenses using a first mask; and a second photolithography process for forming a contact hole for the contact with the drain electrode of thin film transistor using a second mask. In other words, light exposing processes are required twice.

SUMMARY OF THE INVENTION

Accordingly, it is an object of the invention to make a reflection electrode have more enhanced reflectivity and contrast ratio.

It is another object of the invention to precisely form microlens of a reflection electrode as designed.

It is still another object of the invention to simplify the formation of microlenses and contact holes.

To achieve the above objects and other advantages, a reflection type liquid crystal display according to one aspect of the present invention includes a reflection electrode of which surface has a plurality of irregular and convex polygons, widths of respective ravines between the convex polygons being constant. The irregular sizes and heights of the convex polygons in various directions and much reduced flat regions maximize the reflectivity and also minimizes non-homogeneous alignment.

In order to enhance the reflectivity at the front side, a dimple can be formed at the apex of the convex polygon to a certain depth.

A method for fabricating such a reflection type liquid crystal display is also disclosed

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

Figure 2:
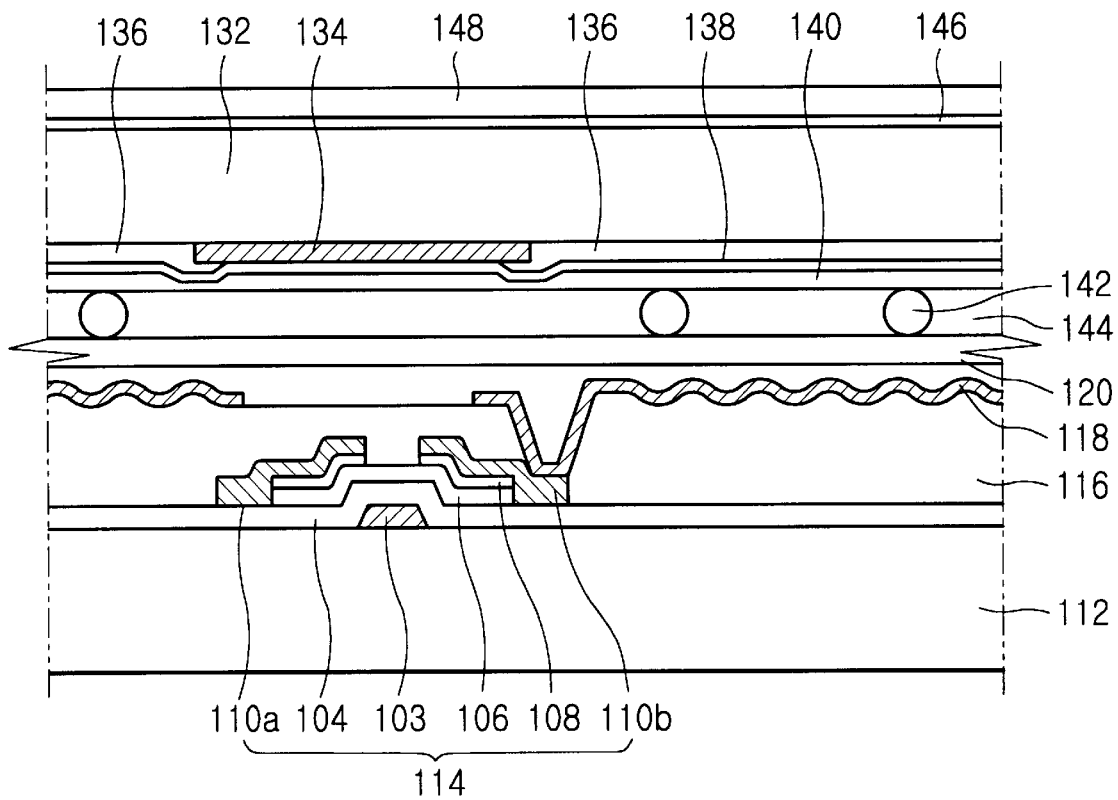
FIG. 2 is a simplified partial plan view of a general reflection type liquid crystal display.

FIG. 2 is a simplified sectional view of a general reflection type liquid crystal display.

Referring to FIG. 2, a reflection type liquid crystal display includes a first insulating substrate 112 and a second transparent insulating substrate 132. The first insulating substrate 112 includes a pixel electrode 118(hereinafter referred to as reflection electrode) reflecting an incident light, of which surface has a plurality of convex portions. A thin film transistor 114 is disposed below the reflection electrode 118. The second transparent insulating substrate 132 includes a phase shift film 146 and a polarizer 148 which are formed in the order named on outer surface thereof. The second transparent insulating substrate 132 further includes a black matrix 134, red, green, and blue color filters 136, and a transparent common electrode 138 that are formed on the inner surface thereof. Liquid crystal layer 144 is interposed between the first insulating substrate 112 and the second insulating substrate 132. Spacers 142 are also interposed between the first insulating substrate 112 and the second insulating substrate 132 so that the liquid crystal layer 144 maintains a certain interval.

There are disposed alignment layers 120, 140 for alignment of liquid crystal molecules on the inner surface of the first insulating substrate 112 and the inner surface of the second insulating substrate 132 including the common electrode 138.

In the above-described constitution, the present invention especially relates to structure and shape of the reflection electrode 118.

Now, operation of the reflective type liquid crystal display is described with reference to FIG. 2.

When the voltage is not applied to the liquid crystal layer (i.e., when thin film transistor is off), the light projected from the above of color filter substrate is changed to a linearly polarized light passing through the polarizer plate 148 and is changed again to a counterclockwise (or clockwise) polarization passing through the phase shift film 146. Then, the counterclockwise (or clockwise) polarization is changed again to a linearly polarized light passing through the liquid crystal layer, and reaches the reflection electrode 118. The reflected linearly polarized light is changed to a counterclockwise (or clockwise) polarization passing through the liquid crystal layer 144, and is changed again to a linearly polarized light passing through the phase shift film 146. Thus, the linearly polarized light passes through the polarizer plate. As a result, the liquid crystal display becomes white state.

On the contrary, if the voltage is applied to the liquid crystal 144, the counterclockwise (or clockwise) polarization passes through the liquid crystal layer 144 without any change, not recognizing birefringence, and the counterclockwise (or clockwise) polarization is changed to the clockwise (or counterclockwise) polarization, with the phase shifted by the reflection electrode. The clockwise (or counterclockwise) polarization is changed to the linearly polarized light which the incident light has rotated 90°, passing through the phase shift film 146. Then, the linearly polarized light is absorbed by the polarizer plate. As a result, the liquid crystal display becomes dark state.

Embodiment 1

Figure 3:
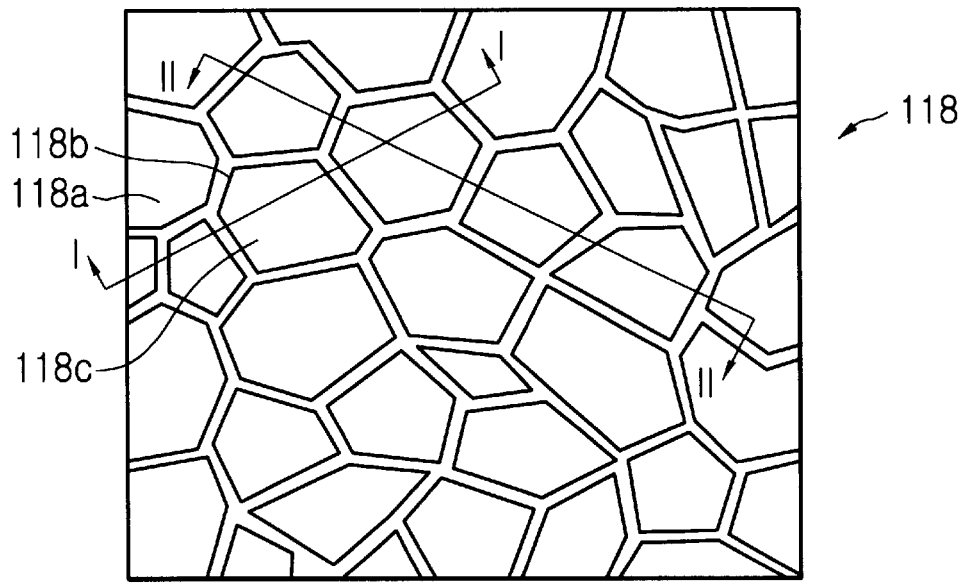
FIG. 3 is a partial plan view of a reflection electrode in accordance with one embodiment of the present invention.

FIG. 3 is a partial plan view of the reflection electrode 118 shown in FIG. 2.

As shown in FIG. 3, the reflection electrode 118 includes a plurality of convex polygons 118a and 118c, each of which has shapes and sizes different from each other. For example, the reflection electrode 118 includes at least two convex polygons and number of total sides of each of the two convex polygons are different from each other. Hereinafter, spaces between respective polygons are referred to as ravine 118b. Preferably, the ravines 118b each has a uniform line width, the line width being within approximately 50% of a distance between apexes of the two adjacent convex polygons. It is preferable that the average distance between the respective apexes of two adjacent convex polygons 118a and 118c ranges from 5 $\mu$m to 30 $\mu$m. For example, when the average distance is approximately 10 $\mu$m, the line width ranges from 1 $\mu$m to 5 $\mu$m.

Figure 4:
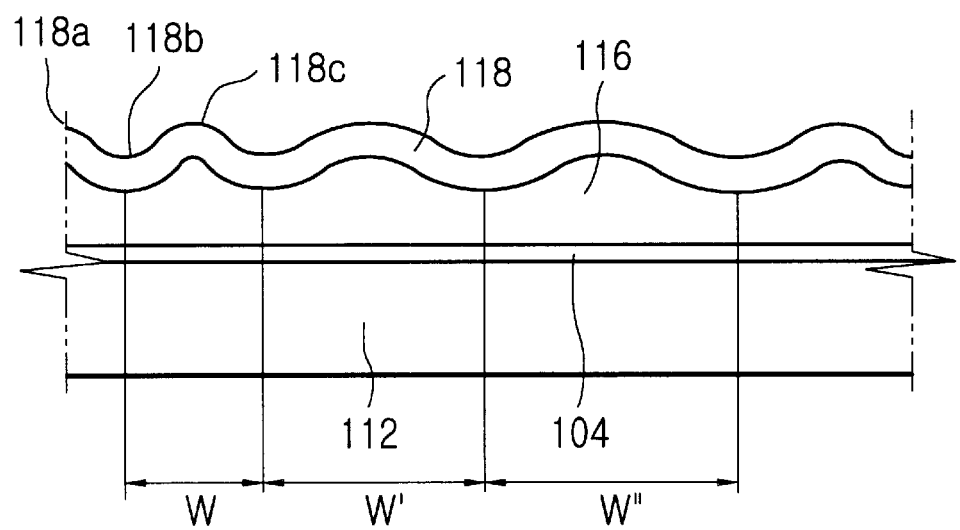
FIG. 4 is a sectional view taken along the line I—I of FIG. 3.

FIG. 4 is a sectional view taken along the line I—I of FIG. 3, and shows the characteristics of the first embodiment.

Referring to FIG. 4, the reflection electrode 118 according to the present invention is made of metal especially having a high reflectivity, such as aluminum. So as to enhance the light reflectivity, the reflection electrode 118 comprises a plurality of convex polygons irregularly disposed. The plurality of convex polygons are formed on an organic insulating layer having the same surface structure as the reflection electrode 118. In other words, the reflection electrode 118 has a surface structure corresponding to that of the organic insulating layer 116.

Preferably, the distances of W, W', and W" between adjacent ravines 118b are different from each other. Heights of the convex polygons are approximately proportional to the distances between the adjacent ravines 118*b*, but heights of the ravines 118*b* from the surface of the first insulating substrate 112 are almost the same.

The above characteristics are shown in any directions as well as in a specific direction. In other words, although not shown, the sectional view along the line II—II of FIG. 3 is also similar to that of FIG. 4.

Embodiment 2

Embodiment 2 according to the present invention comprises at least one dimple formed at apex of the convex polygon shown in FIG. 2.

Figure 5:
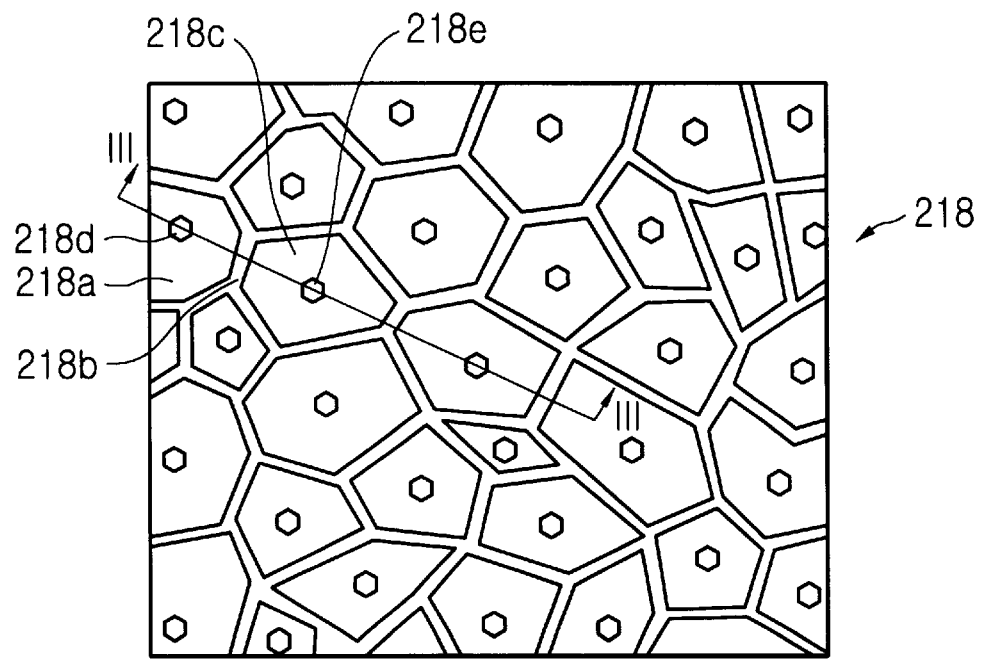
FIG. 5 is a partial plan view of a reflection electrode in accordance with another embodiment of the present invention.
Figure 6:
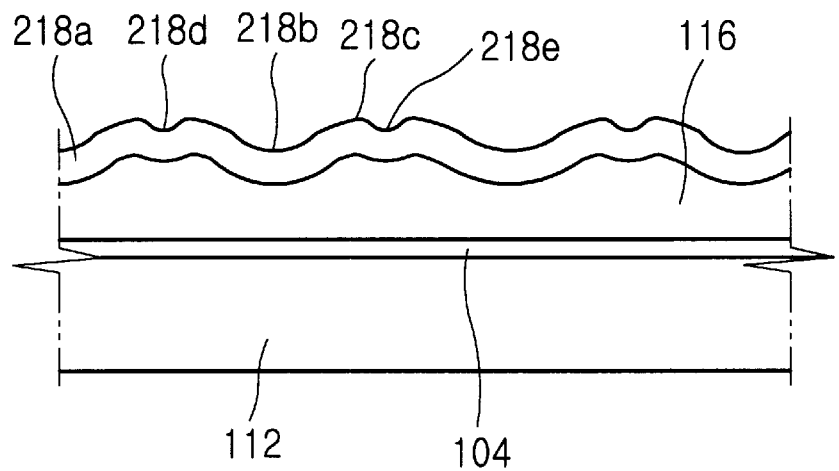
FIG. 6 is a sectional view taken along the line III—III of FIG. 5.

FIG. 5 is a plan view in accordance with the embodiment 2, and FIG. 6 is a sectional view taken along the line III—III of FIG. 5.

Compared with FIGS. 3 and 4, a reflection electrode 218 of the embodiment 2 additionally includes tiny dimples 218*d*, 218*e* subsiding by a selected depth from the apexes of the convex polygons 218*a*, 218*c*.

The dimples 218*d*, 218*e* may have different shapes from the convex polygons when viewed with reference to the central points thereof. However, their diameters reaches approximately 30% compared with those of the convex polygons 218*a*, 218*c*.

Figure 7A:
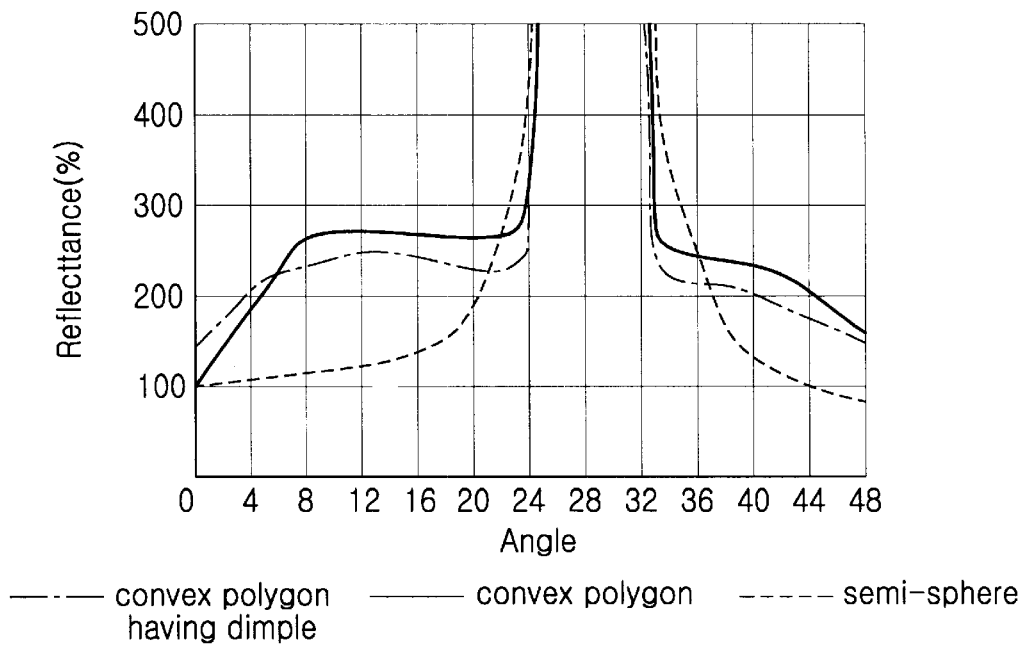
FIGS. 7A and 7B are graphs showing the variation of the reflectivity measured along the vertical and horizontal directions of screens.
Figure 7B:
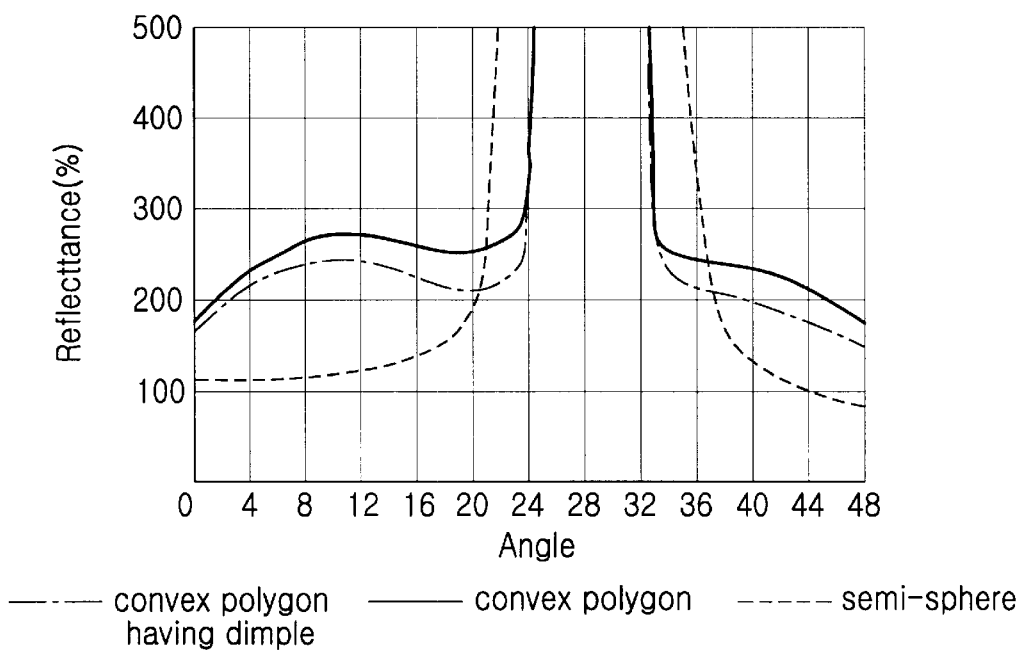

FIGS. 7A and 7B are graphs showing variations in reflectivity as the reflection angle changes when the reflection electrode has different surface shapes. FIG. 7A shows variations in the reflectivity in a vertical direction of the screen and FIG. 7B shows variations in the reflectivity in a horizontal direction of the screen. Here, the reflectivity is measured from the front side of the screen, ranging from zero degree to 50 degrees, when incident angle is −30 degrees.

Figure 1:
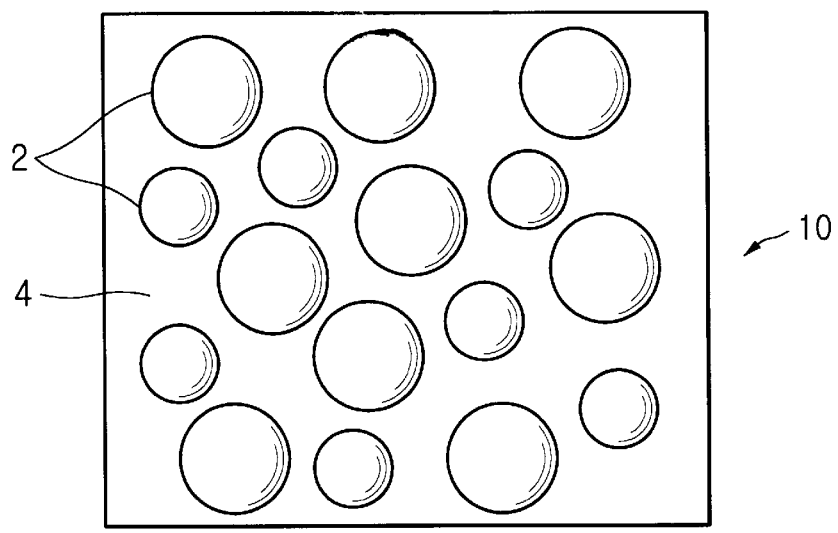
FIG. 1 is a plan view of a reflection electrode in a conventional reflection type liquid crystal display.

As shown in FIG. 7A, when shapes of the convex portions are semi-sphere as shown in FIG. 1, a polygon not having a dimple as shown in FIG. 3, and a polygon having a dimple as shown in FIG. 5 respectively, the polygon structures of FIG. 3 and FIG. 5 both have the vertical reflectivity higher than the semi-sphere structure of FIG. 1 in both ranges of 0 degree to approximately 23 degrees and approximately 37 degrees to approximately 50 degrees. Also, as shown in FIG. 7B, the polygon structure of FIG. 3 and the polygon structure of FIG. 5 both have the horizontal reflectivity higher than the semi-sphere structure of FIG. 1 in both ranges of 0 degree to approximately 18 degrees and approximately 38 degrees to approximately 50 degrees.

The measuring results also show that the polygon having a dimple has a higher reflectivity than the polygon without a dimple when the measuring direction is the front side. Moreover, the results show that the polygon having a dimple has less reflectivity variation than the polygon without a dimple in the measurement ranges.

Meanwhile, in addition to the above described reflectivity, a contrast ratio is also an important factor to determine the display quality.

The following table 1 shows measuring results of the contrast ratio when incident angle of natural light is −30 degrees and measured at the front side of the screen, that is, zero degree. From the table 1, it is seen that the polygon structure has a remarkably higher contrast ratio than the semi-sphere structure of FIG. 1.

TABLE 1

| Classification | Reflectivity (%) | contrast ratio |
| --- | --- | --- |
| semi-sphere (conventional) | 20 | 2:1 |
| Polygon not having the dimple | 30 | 15:1 |

Embodiment 3

Next, embodiment 3 describes a method for designing a mask for the reflection electrodes provided in the embodiments 1 and 2.

A pixel region is defined first. X–y coordinate system is assumed within the pixel region. Afterwards, a plurality of points are created within the x–y coordinate system using a random function generator of a computer. At this time, average distance between two adjacent coordinates is determined by the number of points created within the unit area. For example, when the average distance is determined as 10 $\mu$m, more than 14,000 points are obtained per mm$^2$.

Figure 8A:
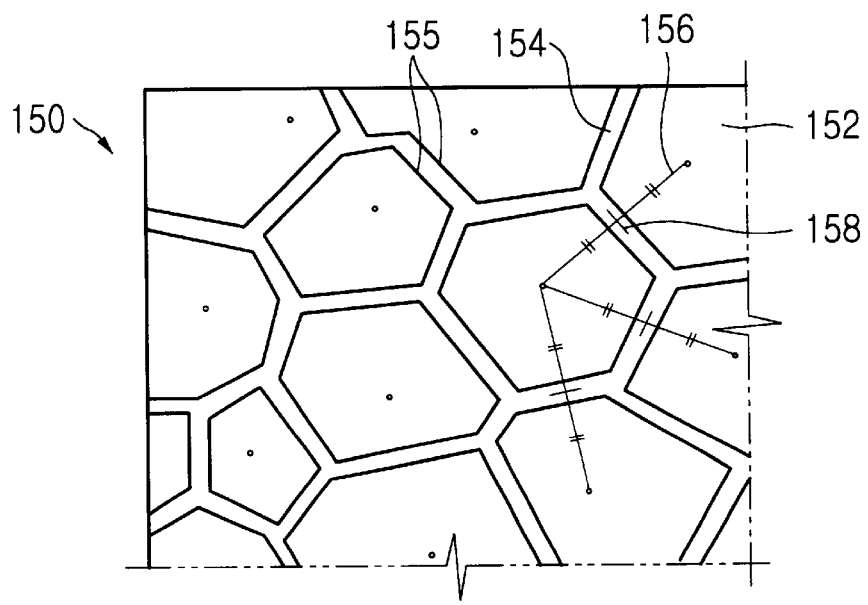
FIG. 8A is a schematic diagram for describing a fabrication process of a photomask for the formation of the reflection electrode of FIG. 3.

As shown in FIG. 8*a*, a plurality of connection lines 156 are formed by connecting two adjacent points. Thereafter, division line 158 that equally divides the respective connecting lines 156 is drawn normal to the connecting line 156. By connecting the division lines 156, a plurality of polygons 152 are formed in a unit pixel region.

It is preferable that the polygons 152 as defined have a size and a shape different from each other.

Next, double lines 155 are drawn for the formation of ravines 154 along respective sides of the polygons 152 as wide as 1–5 $\mu$m. The width corresponding to a range within 50% of average distance between the apexes of two neighboring polygons 152.

After the polygons 152 and ravines 154 are designed, method, a mask is prepared according to the design. When a positive photo-sensitive organic insulating layer is used, opaque regions are positioned at portions corresponding to the polygon patterns 152 and transparent regions are positioned at portions corresponding to the ravine patterns 154. In contrast, when a negative photo-sensitive organic insulating layer is used, the positions of opaque regions and transparent regions have to be reversed.

In addition, when designing a mask having a second polygon pattern for the dimple within the polygon pattern 152, the polygon patterns 152 (hereinafter referred to as first polygon pattern) and ravine patterns 154 are designed first in the same manner as described previously. Thereafter, second polygon patterns are drawn within the first polygon patterns 152 such that diameter thereof is within 30% of the first polygon pattern diameter. Here, the second polygon pattern for the dimple may have different shape from the first polygon pattern 152 but may have the same shape when apex of the first polygon patterns 152 is a reference point.

Figure 8B:
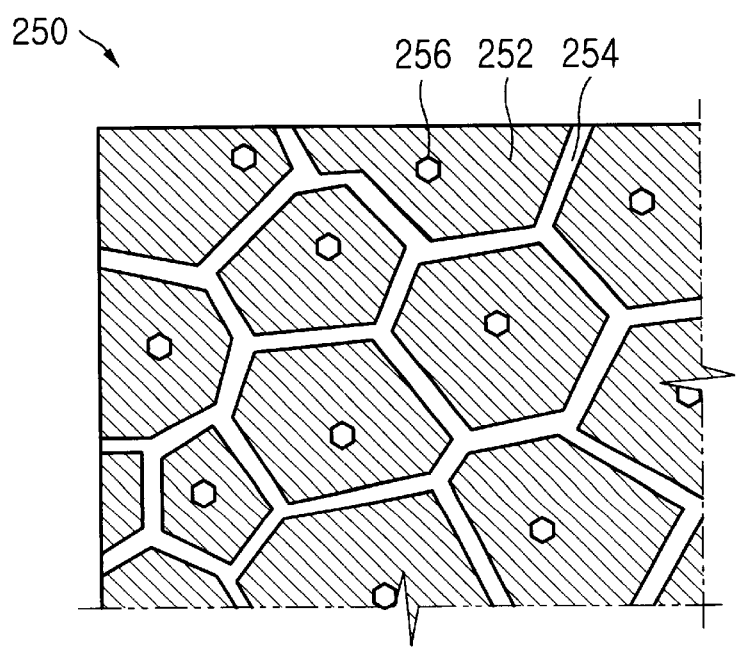
FIG. 8B is a schematic diagram for describing a fabrication process of a photomask for the formation of the reflection electrode of FIG. 5.

As described above, a photomask 250 with a dimple is fabricated as shown in FIG. 8B. Respective portions corresponding to the ravines 218*b* and the dimples 218*e* of the reflection electrode 218 of FIGS. 5 and 6 are allotted to transparent regions 254 and 256 of the photomask 250. Portions corresponding to the convex polygons 218*a* of FIGS. 5 and 6 are allotted to opaque region 252 of the photomask 250.

Figure 9A:
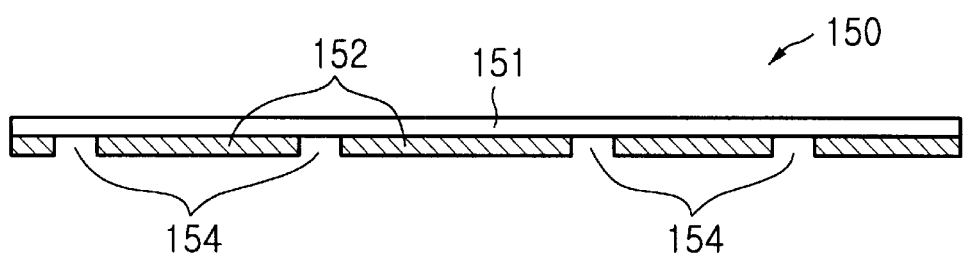
FIG. 9A is a partial sectional view of the photomask of FIG. 8A taken along any direction.
Figure 9B:
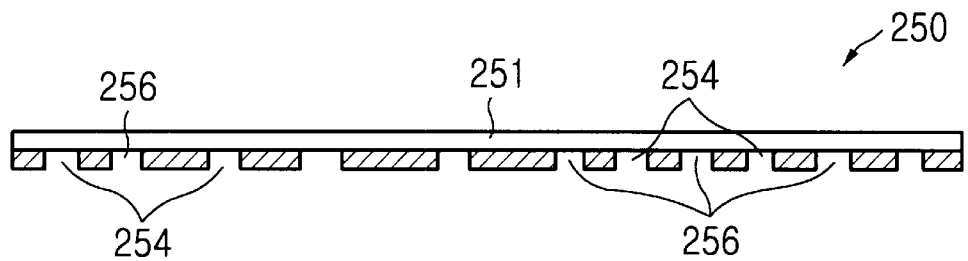
FIG. 9B is a partial sectional view of the photomask of FIG. 8B taken along any direction.

FIGS. 9A and 9B show sectional views of photomasks fabricated by the above method.

Specifically, FIG. 9A is a photomask 150 to form a polygon shaped reflection electrode without a dimple. It is designed for a positive organic insulating layer.

In FIG. 9A, reference numeral 151 is a quartz substrate. Reference numeral 152 is the opaque regions that correspond to the polygon patterns 118a, 118c of FIG. 3. Reference numeral 154 is the transparent regions that correspond to the ravine patterns 118b.

Meanwhile, when an organic insulating layer having negative photo-sensitive characteristic is used, the reference numeral 152 is made to be transparent and the reference numeral 154 is made to be opaque.

FIG. 9B is a photomask 250 to form a polygon shaped reflection electrode with a dimple. It is designed for a positive organic insulating layer. Of course, like the above description, when a negative organic insulating layer is used, the transparent regions and the opaque regions are reversed.

Embodiment 4

Figure 10:
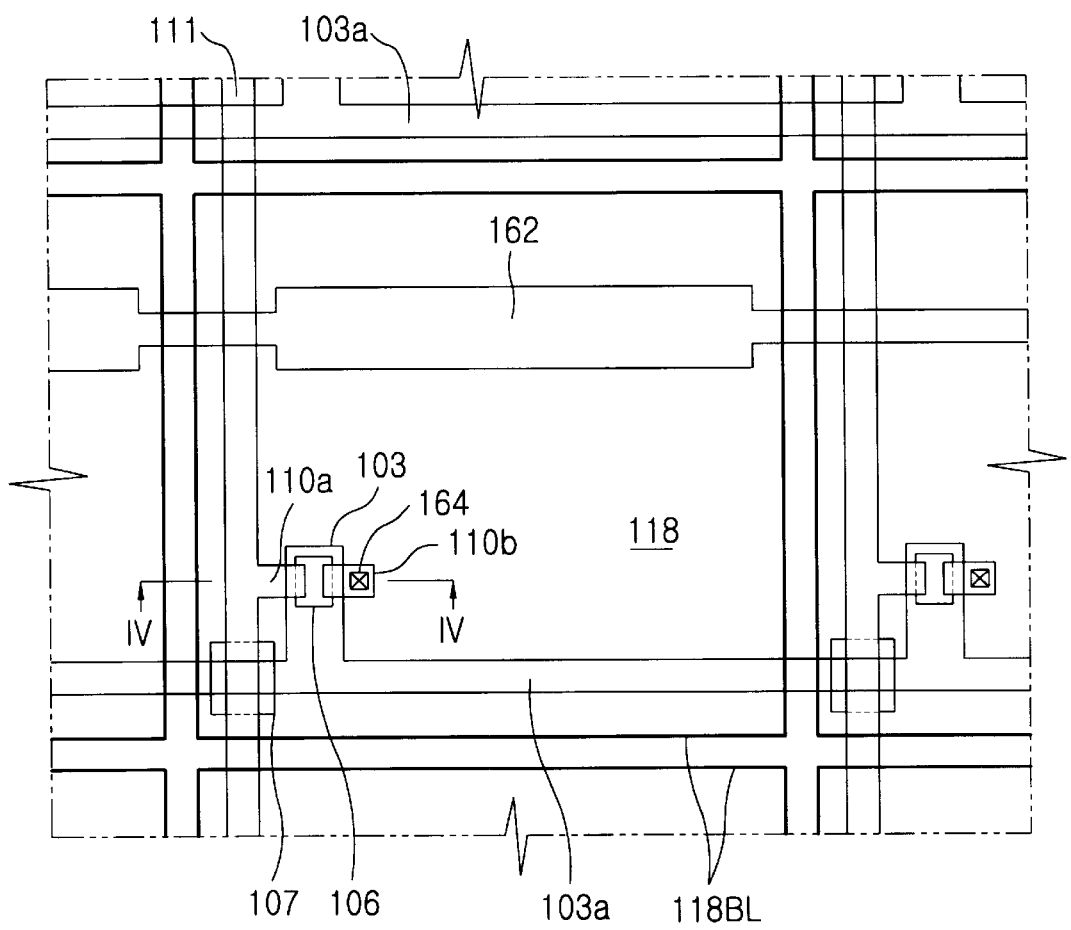
FIG. 10 is a partial plan view of a thin film transistor substrate of a reflection type liquid crystal display in accordance with still another embodiment of the present invention.

FIG. 10 is a simplified partial view of a reflection type liquid crystal display utilizing a thin film transistor as switching element, and shows a unit pixel region and its neighboring portions.

Referring to FIG. 10, a pair of gate lines 103a and gate electrodes 103 perpendicularly branched therefrom are arranged on an insulating substrate 112 along the row direction. A storage electrode 162 is arranged on the insulating substrate 112. The storage electrode 162 lies parallel to the gate line, and apart by a certain distance from the gate line.

A semiconductor film pattern 106 of amorphous silicon is disposed on the gate electrode 103 as a channel layer. Selectively, another semiconductor film pattern 107 is arranged at the crossing point of the gate line 1 03a with data line 111 to be described later. The semiconductor film pattern 107 prevents the data line 111 from opening or the gate line 103a and the data line 111 from shortening to each other.

Although not shown in FIG. 10, for the insulation between the gate 103 and semiconductor film pattern 106, a gate insulating film is interposed therebetween.

The data line 111 is arranged on the gate insulating film normal to the gate line 103a. Source electrode 110a perpendicularly branched from the data line 111 is extended to one edge of the semiconductor film pattern 106 and drain electrode 110b is extended to the other edge of the semiconductor film pattern 106 from a selected portion of the gate insulating film.

Although not shown in FIG. 10, between the source electrode 110a and the semiconductor film pattern 106 and between the drain electrode 110b and the semiconductor film pattern 106, an ohmic contact layer with highly doped n-type impurities is interposed.

A thin film transistor is defined by the combination of the above-described gate electrode 103, the semiconductor film pattern 106, the source electrode 110a, and the drain electrode 110b.

On the entire surface of the resultant substrate including the thin film transistor and the gate insulating film, an insulating layer (not shown) having convex polygon patterns is laid, preferably an organic insulating layer with a photo-sensitivity. On the organic insulating layer is disposed the reflection electrode 118 having a convex polygon pattern as shown in FIG. 3 to FIG. 6. In FIG. 10, reference numeral 118BL represents a border line of the reflection electrode 118. The reflection electrode 118 is connected to the drain electrode 118b through contact hole 164 formed in a selected portion of the organic insulating film.

Although the reflection electrode 118 deviates from the pixel region defined by a pair of gate lines 103a and a pair of data lines 111 and is extended to an edge of the adjacent pixel region, the border line 118BL of the reflection electrode 118 can be located differently. For example, the reflection electrode 118 can be formed only within the unit pixel region except for the portion corresponding to the thin film transistor.

Next, a method for fabricating a thin film transistor substrate of the reflection type liquid crystal display provided in FIG. 10 is described with reference to FIG. 11a to FIG. 11c. Herein, the FIG. 11c is a sectional view taken along the line IV—IV of FIG. 10.

Embodiment 4

Figure 11A:
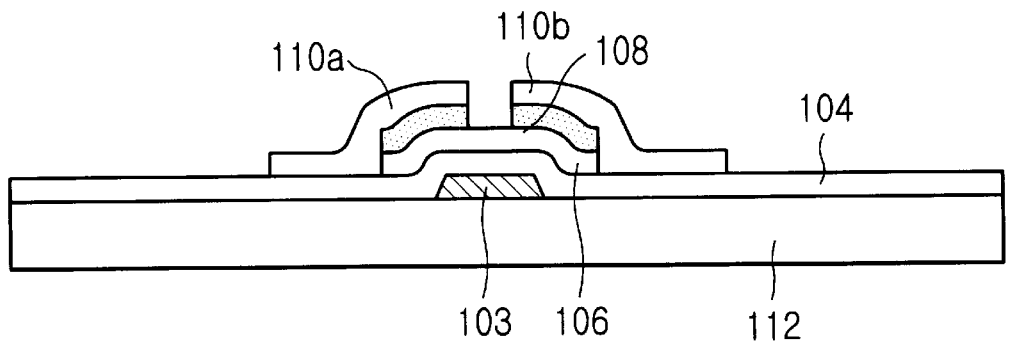
FIGS. 11A to 11C are sectional views showing a fabrication process of the reflective type thin film transistor substrate of FIG. 10.

Referring to FIG. 10 and FIG. 11A, an insulating substrate, for example, glass substrate 112 is prepared. A metal layer is deposited on the glass substrate 112 and is then patterned to form a gate electrode 103 and a gate line 103a. At this time, storage electrode pattern 162 is also formed together with the gate 103 and gate line 103a. On entire surface of a resultant substrate 112 including the gate 103, gate line 103a and storage electrode 162, a gate insulating layer 104 is laid. As gate insulating layer 104, silicon nitride ($Si_xN_y$, where x and y are both integers) or silicon oxide ($SiO_2$) is formed by a chemical vapor deposition using plasma.

Thereafter, a semiconductor layer 106 of amorphous silicon and ohmic contact layer 108 of amorphous silicon in which n-type impurities such as phosphorous or the like are highly doped are orderly formed on the gate insulating layer 104. Meanwhile, although FIG. 11a shows that the semiconductor layer 106 and the ohmic contact layer 108 are both extended to both sides of the gate 103, they can be selectively formed only at the upper portion of the gate 103.

Afterwards, data line 111, source electrode 110a, and drain electrode 110b of metal are formed and the source electrode 110a and the drain electrode 110b are respectively in contact with the ohmic contact layer 108. By now, a thin film transistor is formed.

Figure 11B:
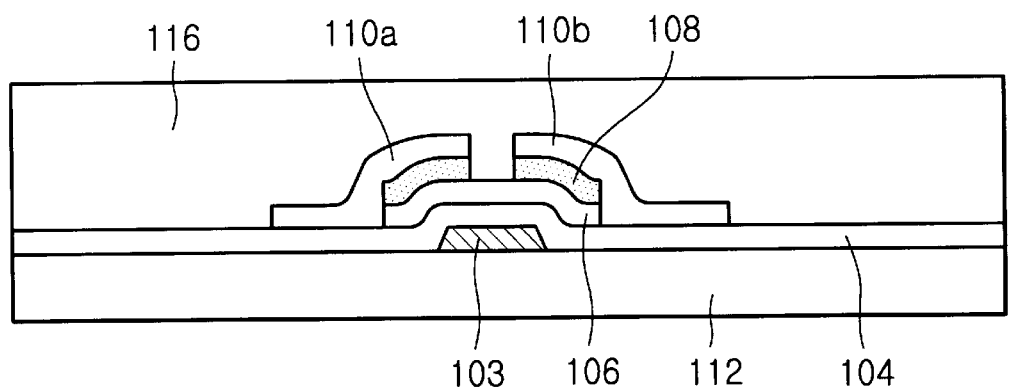
Figure 11C:
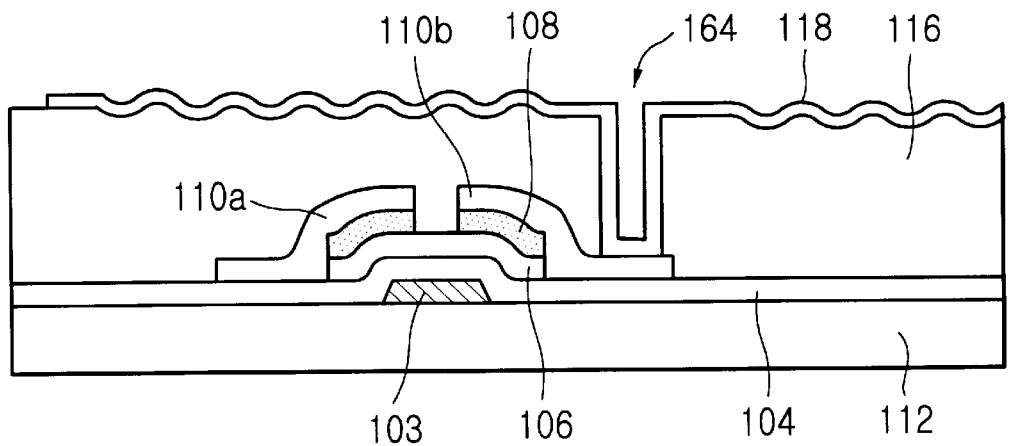

Next, referring to FIG. 11B, a photosensitive organic insulating layer 116 is coated to a thickness of 1–3 $\mu$m. Afterwards, in order to form convex polygons at the surface of the organic insulating layer as coated, the coated organic insulating layer is first exposed to light. The photomasks 150 and 250 shown in FIGS. 9A and 9B can be selectively used to perform first exposing step.

Thereafter, the organic insulating layer is exposed to light again by an additional photomask to form a contact hole that connects the reflection electrode 118 with the drain electrode 110B. Afterwards, the first and second exposed portions of the organic insulating layer 116 are removed by one developing step. Thereafter, the developed organic insulating layer 116 is heated at a selected temperature range, thereby the organic insulating layer patterns remaining after the developing of the exposed portions are flowed to have obtuse and convex shape. Through the above steps, contact hole 264 and convex polygons are respectively formed at the surface of the organic insulating layer 116 as shown in FIG. 11C.

Referring to FIG. 11C, a metal film such as aluminum or the like is deposited on the entire surface of the organic insulating layer 116 and is then patterned by a conventional photolithography method, to form a reflection electrode 118 having convex polygons.

Although not shown in the FIG. 11C, on the entire surface of the organic insulating layer including the reflection electrode 118 is formed an alignment layer to pretilt liquid crystal molecules at a selected angle and a direction.

Thus, according to the embodiment 4, since widths of ravines between convex polygon patterns are constant, microlenses of polygon patterns can be precisely formed as designed Embodiment 5

The fabrication method of the embodiment 4 needs two exposing steps of first exposing to form convex polygons and second exposing step to form contact hole 164. Accordingly, the present embodiment 5 provides an improved method for forming both the convex polygon and the contact hole in one exposing step.

Figure 12A:
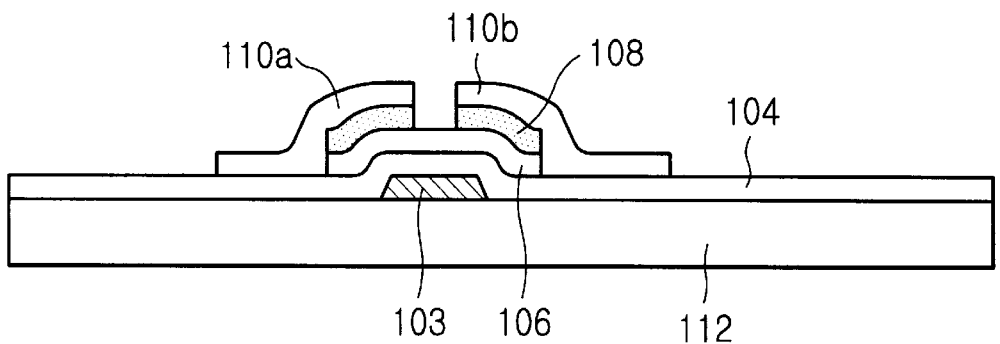
FIGS. 12A to 12C are schematic diagrams for describing a fabrication process of thin film transistor according to another embodiment of the present invention.

FIG. 12A shows a method for fabricating a thin film transistor. The fabrication of thin film transistor is intentionally not described since it is the same as that of the embodiment 4.

Figure 12B:
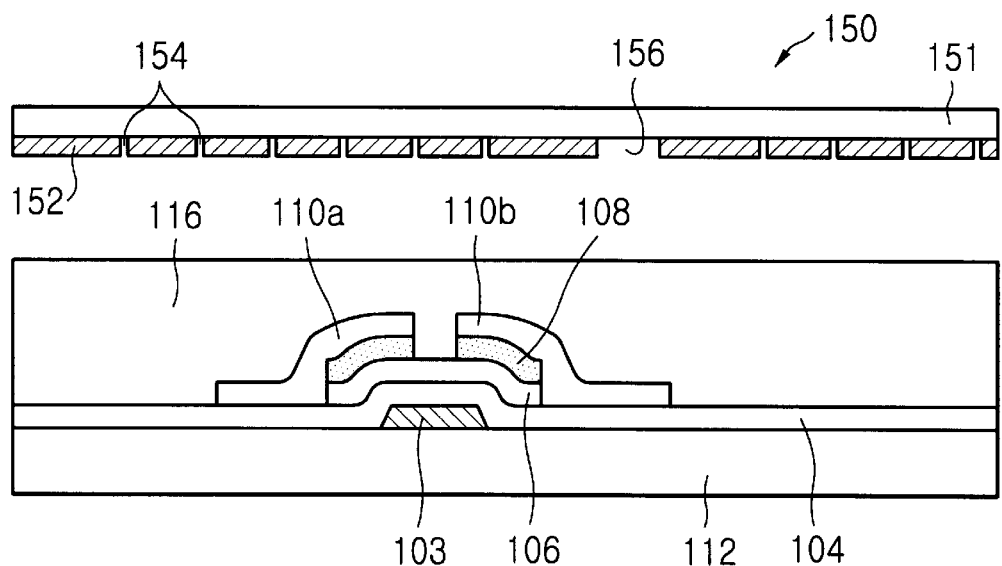

Next, referring to FIG. 12B, a transparent organic insulating layer is coated to a thickness of 1–3 $\mu$m on the substrate where a thin film transistor is formed. In order to form convex polygons at the surface of the organic insulating layer, the coated organic insulating film is exposed to light using a photomask 150 of FIG. 13, and is then developed. The photomask 150 shown in FIG. 13 includes a substrate 151 made of quartz and opaque patterns 152 formed on one surface of the quartz substrate 151. The opaque patterns 152 correspond to polygon patterns. Between the opaque patterns 152 is formed transparent regions 154 (hereinafter referred to as "first transparent region") that is adapted for ravine formed in the photosensitive organic insulating film 116. Reference numeral 156 is a second transparent region formed within a selected opaque region and is adapted for the formation of contact hole. The first transparent region 154 includes multiple lattices 154a of second opaque region which divide the first transparent region 154 into multiple slits 154b. The slits 154b is adapted for the control of depth of ravine formed in the photosensitive organic insulating layer and is designed to have a smaller width than the resolution of light source.

By the slits 154b, the light passing through the first transparent region 154 activate interference and diffraction at the boundary thereof compared with the light passing through the second transparent region 156. As a result, the light passing through the first transparent region 154 exposes the photosensitive organic insulating layer to a depth less than the thickness of the photosensitive organic insulating layer and the light passing through the second transparent region 156 exposes the photosensitive organic insulating layer to the depth equal to the thickness of the photosensitive organic insulating layer.

Subsequently, the substrate is developed to remove the exposed portions of the photosensitive organic insulating layer. By the developing process, a ravine having a depth smaller than the thickness of the photosensitive organic insulating layer is formed at a corresponding portion to the first transparent region 154 of the mask 150. A contact hole 164 is formed at a corresponding portion to the second transparent region of the mask 150.

Thereafter, the photosensitive organic insulating layer that completed the developing process is baked at a selected temperature. The baking process can be selectively performed. By the baking process, the photosensitive organic insulating layer flows down to have a convex structure.

It is noted that the contact hole is formed simultaneously with polygon patterns.

Figure 12C:
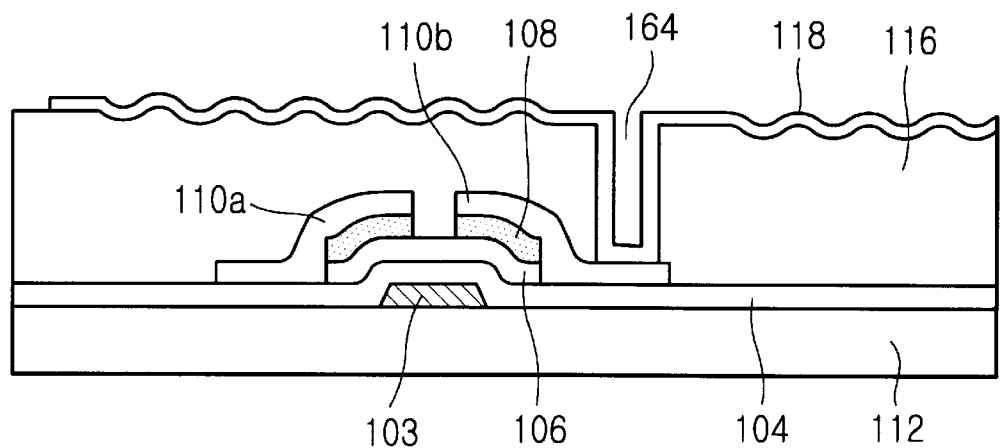

Next, referring to FIG. 12C, a metal film such as aluminum or the like is deposited on the entire surface of the organic insulating layer after the baking process and is then patterned by photolithography, to form a reflection electrode having ravines and convex polygons.

Although not shown in the FIG. 12C, on the entire surface of the organic insulating layer 116 including the reflection electrode 118 is formed an alignment layer to pretilt liquid crystal molecules at a selected angle and direction.

Alternatively, unlike the FIG. 12C, it is possible not to form the reflection electrode on the thin film transistor.

In the above described embodiments 4 and 5, although the photosensitive organic insulating layer is transparent, a photosensitive organic insulating layer with a color, preferably black can be used. The black photosensitive organic insulating layer may eliminate the black matrix of the color filter substrate.

Meanwhile, although not shown in FIGS. 12A–12C, the above-described fabrication method can be applied in forming the reflection electrode having dimples at the convex polygon shown in FIGS. 5 and 6. In this case, other conditions are the same as the above referenced method but a different photomask is used for exposing the photosensitive organic insulating layer.

Figure 13:
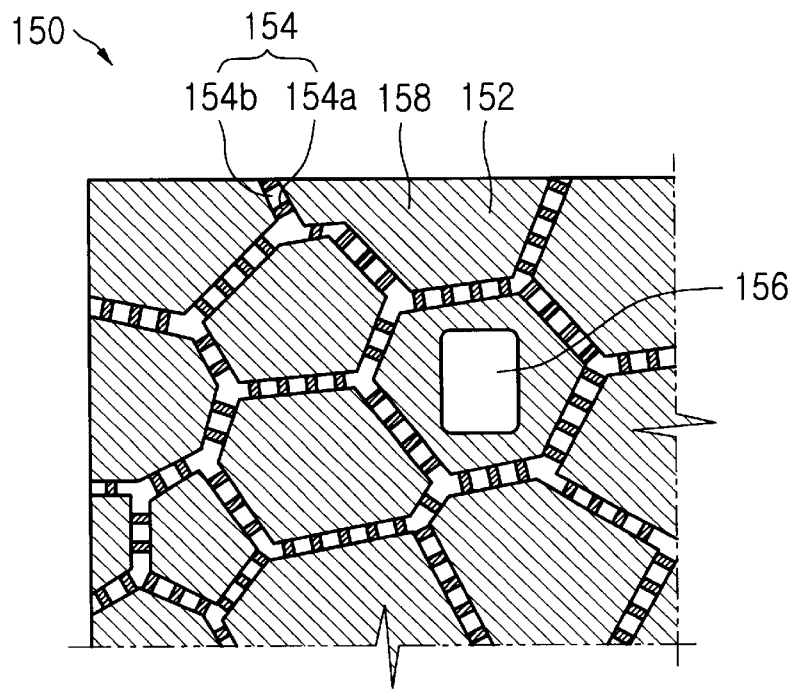
FIG. 13 is a simplified plan view of a mask used in the process of FIG. 12B.
Figure 14:
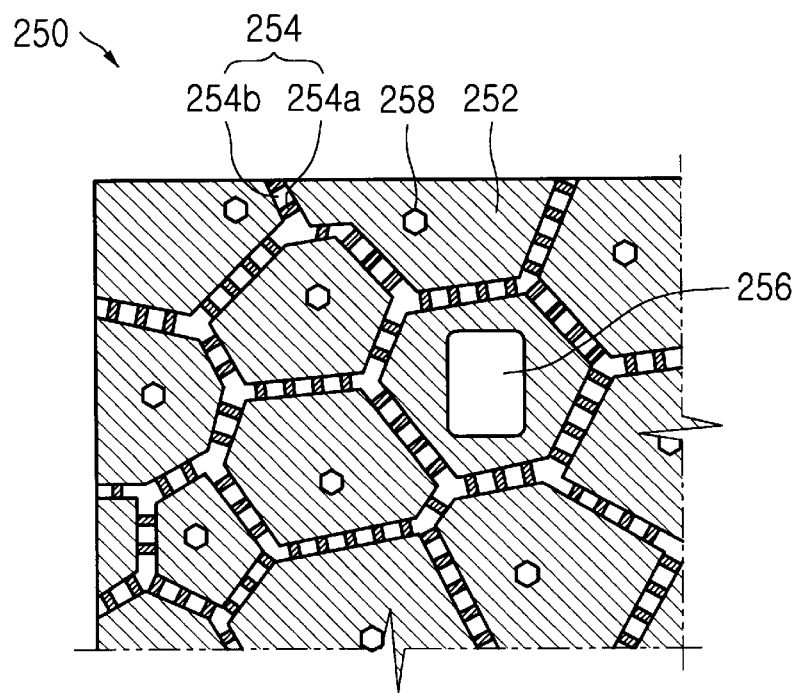
FIG. 14 is a simplified plan view of a mask used in the fabrication process of reflection type liquid crystal display according to yet another embodiment of the present invention.

In other words, as shown in FIG. 14, a mask 250 has a third transparent region 258 corresponding to a dimple. Here, the first transparent region 254 corresponds to the ravine of the photosensitive organic insulating layer 116 of FIG. 12C and the second transparent region 256 corresponds to the contact hole 164 of the photosensitive organic insulating layer 116. Like FIG. 13, the first transparent region 254 includes slits 254b defined between the lattices 254a and 254b.

The diameter differences between the first transparent region 254 and the second transparent region 256, between the second transparent region 256 and the third transparent region 258, cause more diffraction and interference at their respective boundaries to the light passing through the first transparent region 254 and the third transparent region 258 than to the light passing through the second transparent region 256. As a result, the light passing through the first transparent region 254 and the third transparent region 258 exposes the photosensitive organic insulating layer to a depth less than the thickness of the photosensitive organic insulating layer while the light passing through the second transparent region 256 exposes the photosensitive organic insulating layer to a depth equal to the thickness of the photosensitive organic insulating layer.

Afterwards, the substrate is developed to remove the exposed portions of the photosensitive organic insulating layer. During the developing process, portions of the photosensitive organic insulating layer 116 corresponding to the first transparent region 254 of the mask 250 forms a ravine having a depth less than the thickness of the photosensitive organic insulating layer 116. The portion of the photosensitive organic insulating layer 116 corresponding to the second transparent region 256 of the mask 250 forms a contact hole 164 exposing an upper surface of the drain electrode 110b. Finally, portions of the photosensitive organic insulating layer 116 corresponding to the third transparent region 258 forms a dimple (not shown).

Thereafter, the developed organic insulating layer is baked at a certain temperature. The baking process can be selectively performed. By the baking process, the photosensitive organic insulating layer flows down to have a convex structure.

Next, a metal film such as aluminum or the like is deposited on the entire surface of the organic insulating layer after the baking process and is then patterned by a photolithography method, to form a reflection electrode having ravines and convex polygons.

Although not shown in the drawings, on the entire surface of the organic insulating layer 116 including the reflection electrode 118 is formed an alignment layer to pretilt liquid crystal molecules at a certain angle and direction.

In the above described embodiments, although the photosensitive organic insulating layer is transparent, a photosensitive organic insulating layer with a color, preferably black can be used. The color photosensitive organic insulating layer can eliminate the black matrix applied on the color filter substrate.

Meanwhile, by decreasing the width of the first transparent regions 154 and 254 of the first mask 150 and the second mask 250 instead of using the slit shown in FIGS. 13 and 14, the same effect can be obtained.

As described previously, the reflection electrode of the reflection type liquid crystal display with a plurality of irregular and convex polygons and the constant widths of respective ravines between the convex polygons prevent non-uniform arrangement of liquid crystal molecules through all the display regions. As a result, the contrast ratio as well as the reflectivity is highly improved.

Also, since widths of ravines between convex polygon patterns are constant, microlenses of polygon patterns can be precisely formed as designed.

In addition, since the contact hole and the microlenses are formed at the same time in one exposing process, the fabrication process of the reflection type LCD is simplified.

Moreover, the present invention can eliminate black matrix by applying a colored photosensitive organic insulating layer in lieu of a transparent photosensitive organic insulating layer Furthermore, since the ravine width formed along each side of polygon microlens is constant, it is easy to form the microlenses precisely in accordance with its design dimension.

This invention has been described above with reference to the aforementioned embodiments. It is evident, however, that many alternative modifications and variations will be apparent to those skilled in the art in light of the foregoing description. Accordingly, the present invention embraces all such alternative modifications and variations as fall within the spirit and scope of the appended claims.

What is claimed is:

1. A reflection type liquid crystal display, comprising:
    a first transparent insulating substrate;
    a transparent electrode formed on a surface of the first insulating substrate;
    a second insulating substrate;
    a reflection electrode formed on a surface of the second insulating substrate, the reflection electrode comprising a plurality of convex portions formed irregularly thereon and a plurality of ravines formed on spaces between the plurality of convex portions, the plurality of ravines having a uniform width;
    a liquid crystal layer disposed between the transparent electrode and the reflection electrode, and;
    an electrode generating an electric field between the transparent electrode and the reflection electrode,
    wherein each convex portion has a shape and a size different from those of others.

2. The reflection type liquid crystal display according to claim 1, wherein each convex portion is in the shape of a polygon.

3. The reflection type liquid crystal display according to claim 2, wherein said reflection electrode including at least first and second polygon-shaped convex portions, and a number of polygon sides of the first convex portion is different from that of the second convex portion.

4. The reflection type liquid crystal display according to claim 1, wherein the reflection electrode further comprises a dimple with a certain depth at an apex of the convex portion.

5. The reflection type liquid crystal display according to claim 1, wherein an average distance between apexes of adjacent convex portions ranges from approximately 5 $\mu$m to approximately 30 $\mu$m.

6. The reflection type liquid crystal display according to claim 1, wherein the uniform width of said plurality of ravines does not exceed 50% of average distance between apexes of two adjacent convex portions.

7. The reflection type liquid crystal display according to claim 1, wherein the ravines have the same height and the convex portions have heights different from each other when measured from the surface of said second insulating substrate.

8. The reflection type liquid crystal display according to claim 1, wherein the ravines have heights different from each other and the convex portions have the same height as measured from the surface of said second insulating substrate.

9. A method for fabricating a reflection type liquid crystal display, comprising the steps of:
    coating a photosensitive organic insulating film on an entire surface of an insulating substrate where a switching element is formed, wherein the switching element comprises source, drain and gate terminals;
    first exposing the photosensitive organic insulating film to light to a depth less than a thickness of the photosensitive organic insulating film by using a first mask;
    second exposing the photosensitive organic insulating film using a second mask having a transparent region at a portion over the drain terminal;
    developing exposed portions of the photosensitive organic insulating film;
    baking the developed photosensitive organic insulating film at a selected temperature;
    depositing a reflective film on the photosensitive organic insulating layer; and
    patterning the deposited reflective film to form irregularly a plurality of convex portions and a plurality of ravines on spaces between the plurality of convex portions, wherein each convex portion has a shape and a size different from those of others, and the plurality of ravines have a uniform width.

10. The method according to claim 9, wherein the photosensitive organic insulating film is coated to a thickness of approximate 1–3 $\mu$m.

11. The method according to claim 9, wherein the first mask comprises a transparent region within a selected portion of an opaque region.

12. A method for fabricating a reflection type liquid crystal display, comprising the steps of:
    coating a photosensitive organic insulating film on an entire surface of an insulating substrate where a switching element is formed, wherein the switching element comprises source, drain and gate terminals;
    exposing the photosensitive organic insulating film to light using a mask;

developing said exposed portions of the photosensitive organic insulating film;

depositing a reflective metal film on the photosensitive organic insulating layer; and patterning the deposited reflective metal film, wherein the mask comprises a plurality of opaque regions with irregularly shaped polygon patterns, a first transparent region of a constant width placed between the opaque regions, and a second transparent region corresponding to a contact hole, and the second transparent region is disposed within one of the opaque regions.

13. The method according to claim 12, wherein the first transparent region of the mask comprises a plurality of lattice that divide the first transparent region into a plurality of slits.

14. The method according to claim 13, wherein the second transparent region is bigger than each slit of the first transparent region.

15. The method according to claim 12, wherein the opaque region comprises at least two kinds of polygons that are different in numbers of sides.

16. The method according to claim 12, wherein the mask further comprises a third transparent region formed within the opaque region.

17. The method according to claim 16, wherein the third transparent region is smaller than the second transparent region.

18. The method according to claim 12, wherein the photosensitive organic insulating layer is black.

19. The method according to claim 12, further comprising a step of baking the developed organic insulating film at a certain temperature prior to the step of depositing a reflective metal film.

* * * * *